UNITED STATES PATENT OFFICE.

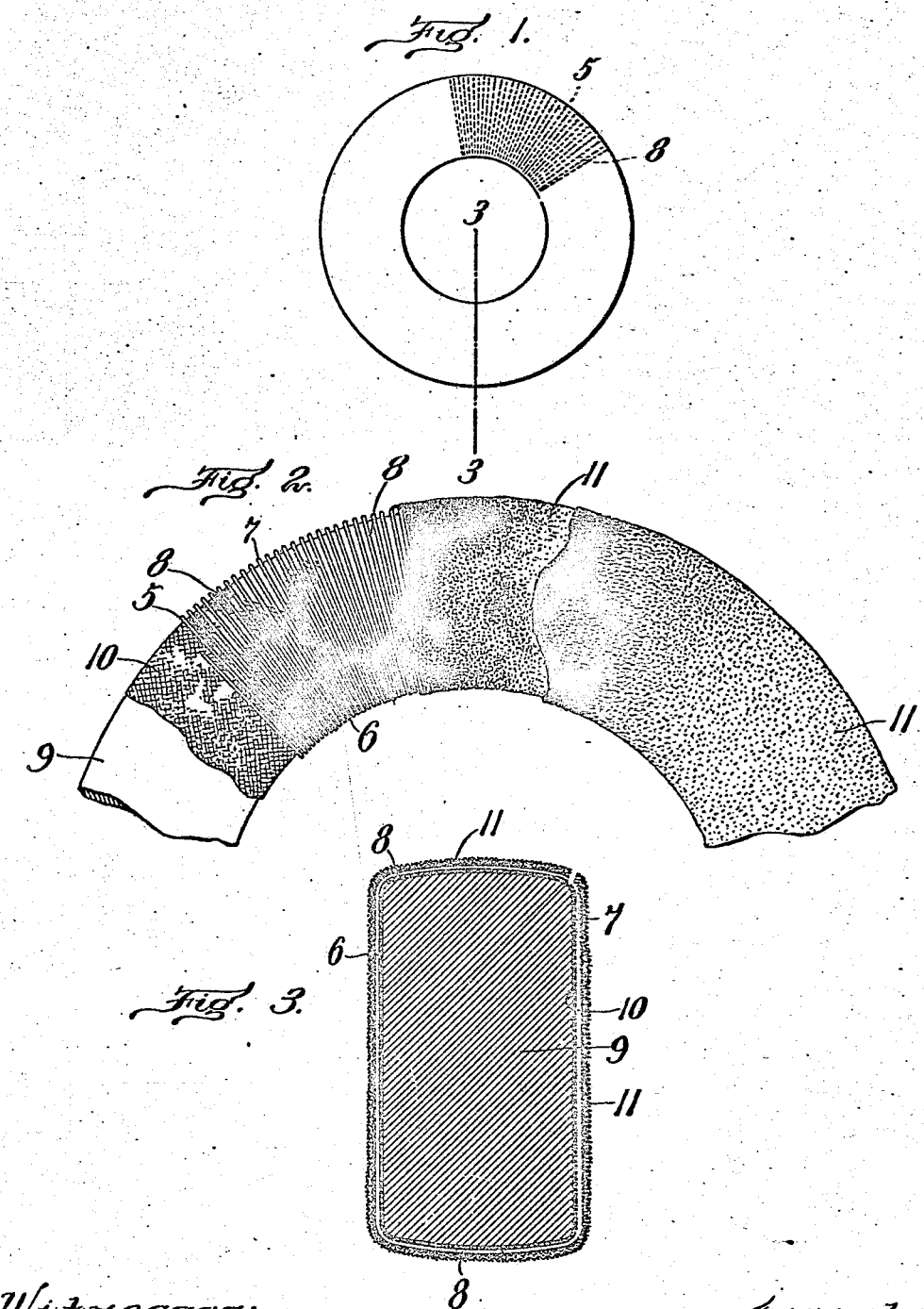

GEORGE R. NOBLE, OF BOSTON, MASSACHUSETTS.

PACKING.

No. 895,037.

Specification of Letters Patent.

Patented Aug. 4, 1908.

Application filed December 7, 1907. Serial No. 405,476.

*To all whom it may concern:*

Be it known that I, GEORGE R. NOBLE, of Boston, in the county of Suffolk and State of Massachusetts, have invented a new and useful Improvement in Packing; and I hereby declare that the following is a full, clear, and exact description of the same, reference being had to the accompanying drawings, forming part of this specification.

This invention has reference to improvements in packing and particularly to improvements in rod packing, so called.

One object of the invention is to so construct a packing of this general nature that the same may be durable and resilient.

Another object of the invention is to so construct a packing of this nature that its resilient action, under endwise stress shall be exerted from its periphery towards its bore whereby, under said stress, the action of the packing is to contract said bore but, under relief from said stress, the retractive resilience of the packing may act to expand said bore.

Another object of the invention is to provide a novel packing containing lubricant.

The invention consists in the peculiar features of construction and novel combination of parts as shall hereinafter be more fully described and pointed out in the claims.

Figure 1, represents a plan view of the improved packing in ring form. Fig. 2, represents a similar view on enlarged scale of parts of the same of which portions are broken away. Fig. 3, represents a sectional view taken on line 3—3 Fig. 1.

Similar numbers of reference, designate corresponding parts throughout.

In carrying this invention into practice my main object has been to provide a packing which, while adapted for use with good results under constant compressive strain, is particularly adapted for use under conditions where varying pressures are exerted against the packing or where such pressures are pulsating and to so construct and combine the several parts of which the packing is composed that the resilient element may be responsive to comparatively slight variations in pressure.

As shown in the drawings in its preferred form 5 indicates the resilient element formed of nickel spring steel wire or similar material of durable resilience under the action of heat or pressure. This wire may have any suitable cross sectional shape and the cross sectional shape of the element 5 as a whole may be decided by the use to which the packing is to be put but such cross sectional shape, for rod packing, is preferably approximately rectangular whereby the members 6 and 7 will be approximately parallel to the wall of the stuffing box and to the rod movable therein for which the particular packing is designed. The members 8—8 of this resilient member preferably curve outward slightly as shown in Fig. 3. Within the resilient member 5 is placed the lubricant core 9 preferably furnished with the textile covering 10 and said core and its resilient member is then formed into a ring and said ring is wrapped with one or more layers 11 of asbestos cloth in which is included lubricating material preferably of a metallic nature. For this purpose I have found ordinary white metal, so called, is satisfactory.

For some purposes it may be desirable to form the packing in lengths which may be wrapped spirally around a rod or other part or formed into rings.

When this packing is placed in a stuffing box its periphery should preferably closely fit the wall of the box while the bore of the packing ring fits the piston rod. It is to be noticed that owing to the radial extension of the members 8—8 of the resilient element the members 6—6 of this element are close together in the bore while the members 7—7 are somewhat separated. When now pressure is brought against the members 8—8 in a direction to compress the packing the tendency is to force outward the ends of said members to spread the members 6 and 7 but as the members 6—6 are in contact they maintain their parallelism and bear on the piston rod while the members 7—7 are slightly bowed outward towards the wall of the stuffing box and the reaction of these members 7—7 from the positive resistance of said wall crowds the bore of the packing-ring against the piston rod therein. When such pressure is relieved the reaction of the members 8—8 tends to relieve the friction on the piston rod and, with rapid variations in pressure, a pulsating action of the members of the resilient element is effected whereby the outer surface of the wrapping 11 is acted upon to spread the same into contact with the parts to be packed and the core 5 is acted upon, by the resilient element, to press some part of the lubricant therefrom through the spaces between the members of the resilient member 5 and through the interstices of the several wrappings.

The core 9 is preferably formed of grease or similar lubricant having a high melting point so that it will not become unduly soft under the ordinary temperatures in which the packing is used.

Having thus described my invention I claim as new and desire to secure by Letters Patent.

1. Packing comprising a spirally wound spring, a core contained within said spring, and a wrapping of asbestos outside said spring.

2. Packing comprising an annular tubular spring member, a core of lubricating material contained within said spring member, and a wrapping around the exterior of said spring member.

3. Packing comprising a ring formed of spirally wound spring wire the convolutions of which are radial to the axis of said spring and a covering of asbestos material.

4. Packing comprising a ring formed of a rectangular spiral spring and a wrapping for said spring.

5. Packing comprising a ring formed of a spiral spring wire the convolutions of which extend radially to the axis of the ring, a core of lubricant within the convolutions of said spring and a covering on the exterior of said spring.

6. Packing comprising a ring formed of a spiral spring approximately rectangular in shape but having members thereof slightly curved, said curved members extending radially to the axis of said ring, a core of lubricating material within said spring and a covering of asbestos.

GEORGE R. NOBLE.

Witnesses:
 HENRY J. MILLER,
 M. M. HARRINGTON.